(12) United States Patent
Amselem et al.

(10) Patent No.: US 9,602,870 B2
(45) Date of Patent: Mar. 21, 2017

(54) DEVICES, SYSTEMS, METHODS, AND MEDIA FOR DETECTING, INDEXING, AND COMPARING VIDEO SIGNALS FROM A VIDEO DISPLAY IN A BACKGROUND SCENE USING A CAMERA-ENABLED DEVICE

(75) Inventors: David Amselem, Meitar (IL); Yuval Hava, Meitar (IL); Adi Shavit, Mevasseret-Zion (IL); Dana Shavit, Mevasseret-Zion (IL)

(73) Assignee: TvTak Ltd. (IL)

( * ) Notice: Subject to any disclaimer, the term of this patent is extended or adjusted under 35 U.S.C. 154(b) by 627 days.

(21) Appl. No.: 13/821,983

(22) PCT Filed: Apr. 1, 2012

(86) PCT No.: PCT/IB2012/051584
§ 371 (c)(1),
(2), (4) Date: Apr. 14, 2013

(87) PCT Pub. No.: WO2012/131653
PCT Pub. Date: Oct. 4, 2012

(65) Prior Publication Data
US 2014/0020005 A1 Jan. 16, 2014

Related U.S. Application Data

(60) Provisional application No. 61/469,875, filed on Mar. 31, 2011.

(51) Int. Cl.
*G06K 9/48* (2006.01)
*H04N 21/44* (2011.01)
*G06K 9/00* (2006.01)

(52) U.S. Cl.
CPC ... *H04N 21/44008* (2013.01); *G06K 9/00744* (2013.01)

(58) Field of Classification Search
CPC ........ G06F 17/30781; G06F 17/30241; G06K 9/00744; H04N 21/44008
See application file for complete search history.

(56) References Cited

U.S. PATENT DOCUMENTS

| | | | |
|---|---|---|---|
| 5,436,653 | A | 7/1995 | Ellis et al. |
| 6,469,749 | B1 | 10/2002 | Dimitrova et al. |

(Continued)

FOREIGN PATENT DOCUMENTS

| | | |
|---|---|---|
| CN | 1703694 | 11/2005 |
| CN | 101299269 | 11/2008 |

(Continued)

OTHER PUBLICATIONS

"Extended European Search Report and Opinion", mailed Mar. 18, 2015. PCT/IB2012051584. 7 Pages.

(Continued)

*Primary Examiner* — Gregory M Desire
(74) *Attorney, Agent, or Firm* — Stetina Brunda Garred & Brucker

(57) ABSTRACT

The present invention discloses methods for detecting, indexing, and comparing video signals from a video display in a background scene using a camera-enabled device. Methods include the steps of: pointing a camera-enabled (CEN) device at a video-signal surface; detecting a location of the video-signal surface in the background scene on the CEN device; and extracting at least one frame from the detected video-signal surface. Preferably, the method further includes the steps of: obtaining at least one image from at least one extracted frame; computing at least one compact signature from at least one image; comparing at least one compact signature with at least one stored compact signature in a database; and determining whether at least one match (Continued)

was found between at least one compact signature and at least one stored compact signature.

18 Claims, 13 Drawing Sheets

(56) References Cited

U.S. PATENT DOCUMENTS

| | | | | |
|---|---|---|---|---|
| 8,676,273 | B1* | 3/2014 | Fujisaki | H04M 1/6505 379/142.06 |
| 8,781,152 | B2* | 7/2014 | Momeyer | G06K 9/00744 725/19 |
| 2002/0044691 | A1* | 4/2002 | Matsugu | G06K 9/20 382/218 |
| 2002/0059633 | A1 | 5/2002 | Harkness et al. | |
| 2004/0061776 | A1 | 4/2004 | Mochida et al. | |
| 2007/0136741 | A1 | 6/2007 | Stattenfield | |
| 2008/0066098 | A1 | 3/2008 | Witteman et al. | |
| 2008/0298571 | A1 | 12/2008 | Kurtz et al. | |
| 2009/0083781 | A1* | 3/2009 | Yang | G06F 17/30781 725/20 |
| 2010/0302376 | A1* | 12/2010 | Boulanger | G06T 7/0097 348/164 |
| 2011/0286628 | A1* | 11/2011 | Goncalves | G06F 17/30256 382/103 |
| 2011/0313856 | A1 | 12/2011 | Cohen et al. | |
| 2011/0314049 | A1* | 12/2011 | Poirier | G06F 17/30241 707/769 |
| 2012/0081500 | A1 | 4/2012 | Border et al. | |
| 2012/0114167 | A1 | 5/2012 | Tian et al. | |
| 2014/0020005 | A1* | 1/2014 | Amselem | G06K 9/00744 725/19 |

FOREIGN PATENT DOCUMENTS

| | | |
|---|---|---|
| CN | 101840422 | 9/2010 |
| JP | 2000285654 | 10/2000 |
| JP | 2005004697 | 1/2005 |
| JP | 2006285654 | 1/2006 |
| JP | 200685654 | 10/2006 |
| JP | 2006285654 | 10/2006 |
| JP | 2007049584 | 2/2007 |
| JP | 2009505477 | 2/2009 |
| JP | 2010529735 | 8/2010 |
| JP | 2011028374 | 2/2011 |
| KR | 1020080013959 | 2/2008 |
| WO | WO03050718 | 6/2003 |
| WO | WO 2007/004519 A1 | 1/2007 |
| WO | WO 2007020569 | 2/2007 |
| WO | WO2007053112 | 5/2007 |
| WO | WO2009150425 | 12/2009 |
| WO | WO2011032168 | 3/2011 |

OTHER PUBLICATIONS

Lee, Min-Jeong et al., "Improved Watermark Detection Robust to Camcorder Capture Based on Quadrangle Estimation"; Nov. 7, 2009. 4 Pages.

Yu, Hang et al., "Recaptured Photo Detection Using Specularity Distribution"; Oct. 12, 2008. 4 Pages.

Shuuichirou Akou, "Decision of Rejection", Mailed Jun. 16, 2015. Pat. App. 2014-501803. 6 Pages. Translation Attached.

ISA/US, International Search Report and Written Opinion for International Application Pub No. WO2012-131653, dated Sep. 11, 2012; 2 pages.

Shuichiro Ako, "Notice of Reasons for Rejection", Mailed Nov. 4, 2014. Japanese Office Action. Pat. App. 2014-501803. 9 Pages. Translation Attached.

Anton Versluis, "Supplementary Partial European Search Report", Mailed Nov. 13, 2014. PCT/IB2012051584. 5 Pages.

"Search Report and First Office Action", Issued Jun. 6, 2016. Chinese Office Action. 2012800226878. 23 Pages including English Translation.

"Reasons of Rejection", Mailed Sep. 26, 2016. Korean Office Action. Pat. App. 10-2013-7027056. 11 Pages. Translation Attached.

Ryoichi Takaoka, "Office Action", Mailed Sep. 13, 2016. Japanese Office Action. Pat. App. 2015-204198. 29 Pages. Translation Attached.

"Special Edition: Digital Fingerprints and Digital Watermarks are Taken Off Using Request of Freedom to Copy to Second Part of New-type DRM as Driving Force," Nikkei Electronics, Mar. 10, 2008 (No. 973), Nikkei Business Publications, Inc., Mar. 10, 2008, pp. 66 to 74, ISSN:0385-1680.

* cited by examiner

DEVICES, SYSTEMS, METHODS, AND MEDIA FOR DETECTING, INDEXING, AND COMPARING VIDEO SIGNALS FROM A VIDEO DISPLAY IN A BACKGROUND SCENE USING A CAMERA-ENABLED DEVICE

CROSS REFERENCE TO RELATED APPLICATIONS

This patent application claims priority under 35 U.S.C. §119(e) to U.S. Provisional Patent Application No. 61/469,875 filed Mar. 31, 2011, and under 35 U.S.C. §365(a) to PCT Patent Application No. IB2012/051584 filed Apr. 1, 2012, which are hereby incorporated by reference in their entirety.

FIELD AND BACKGROUND OF THE INVENTION

The present invention relates to devices, systems, methods, and media for detecting, indexing, and comparing video signals from a video display in a background scene using a camera-enabled device.

With the advent of interactive multimedia, social networking, and the widespread proliferation of camera-enabled smartphones and other mobile devices, consumers of electronic devices have sought new ways to share their daily experiences with their contacts (e.g., friends, relatives, and business associates) using technology. Tweeting and blogging, as well as multi-user online games and forums, are a few examples of these.

To keep up with this trend, digital-content publishers and mobile-device manufacturers have been looking for means to combine integrative platforms into traditional media (e.g., music, radio, and television) distribution and access. In the area of televised content, online TV guides and interfaces for scheduling a user's viewing preferences are common. However, sharing one's current TV viewing activity is still limited by the fact that the user has to make some keyboard or touch-panel entries in order for a device to know what he/she is watching.

It would be desirable to have devices, systems, methods, and media for detecting, indexing, and comparing video signals from a video display in a background scene using a camera-enabled device. Such systems, methods, and media would, inter alia, overcome the limitations mentioned above.

SUMMARY

It is the purpose of the present invention to provide devices, systems, methods, and media for detecting, indexing, and comparing video signals from a video display in a background scene using a camera-enabled device.

In the interest of clarity, several terms which follow are specifically defined for use herein. The term "video" is used herein to refer to the technology of electronically processing and reconstructing a sequence of still images representing scenes in motion. The term "video signal" is used herein to refer to a video being presented on a television set, a computer screen, a video monitor/display, or a projection screen using a video projector such as in conference-room presentations, classroom training, home-theatre viewings, and other live events, for example.

The term "background scene" is used herein to refer to any visual element contained in an image (or sequence of images) captured by a camera-enabled (CEN) device. For example, the background scene of an image of a park could include benches, swings, fountains, people, grass, and clouds, as well as phones, portable videogames, and mobile electronic media devices.

The terms "video-signal camera-capture" and "VSCC" are used herein to refer to a detected surface displaying a video signal in a background scene in real-time. For example, a video-signal camera-capture could be obtained from a background scene of a living room, conference room, or outdoor space, in which a video display is an element of the scene to detect the displayed surface of the video signal on the video display.

The general term "system" is used herein to refer to any implementation of the present invention including software (e.g., execution of a process or method), firmware, hardware performed (in whole or in part) on a CEN or other device, as well as being performed (in whole or in part) on a remote system such as a back-office system or a cloud-based service, for example.

Furthermore, it is noted that the term "exemplary" is used herein to refer to examples of embodiments and/or implementations, and is not meant to necessarily convey a more-desirable use-case. Similarly, the term "preferred" is used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Embodiments of the present invention enable users of a CEN device to tell what video program they are watching by just pointing the camera of the device toward their television set or video display. The system detects, inter alia, what channel, program, and type of program (e.g., themed content, promotions, or ads) is being watched within a few seconds, and sends contextually-relevant content and services to the user's device.

Some embodiments of the present invention enable users to share their viewing activity and comment on the content on social networks. Such embodiments enable auto-cropped images to be obtained, extracting pictures from the video-signal surface within the background scene captured by the CEN device. As an example of a use case, some embodiments of the present invention allow the user to add text comments to the auto-cropped images for sharing with others who are watching the same or other programmed content. Further embodiments enable the user to view all the comments posted by other users for the specific show they are watching. In other embodiments, the user can attach icons symbolizing his/her feelings about a program to share with other users.

In additional embodiments, the user can view all the comments posted by other users for a specific show or channel the user is watching. In some implementations, the system performs an automatic search and aggregation of comments related to a specific television program, selects the most relevant and interesting comments, and displays the selected comments to the user.

Some embodiments of the present invention provide real-time viewing statistics to the user. In such embodiments, at any given moment, the system can provide the percentages of users of the system watching each channel available locally to the TV viewers, for example. Viewership can be presented as a pie chart or other graphical representation; the user can filter the percentages by selecting "all users," "friends linked through social networks," or "other users with a similar profile," for example.

In further embodiments, the system displays on the device a short synopsis (e.g., a few phrases) of what has previously happened in the show being viewed. In some embodiments, the synopsis is generated in the following way.

1. Automatically retrieving in real-time a transcription of the audio track of the program via:
   a. capturing the subtitles embedded within the digital stream of the television broadcast; and/or
   b. analyzing the audio track of the television station including:
      i. identifying and classifying the speakers; and/or
      ii. analyzing the audio track for speech-to-text processing to transcribe in real-time what is being said in the broadcast; and/or
2. using statistical analysis and language models (for determining the relative importance of words in sentences according to their general distribution in a reference corpus) to extract the most significant content fragments from the transcription to summarize the content.

Other embodiments of the present invention enable a contextual "quiz" or "vote" to be automatically generated from content of the show being broadcast. In preferred implementations of such embodiments, the user can participate in the quiz or vote which is automatically generated from the transcripts captured while the show is being broadcast. As an example of a use case, the system takes a relevant short sentence from the real-time transcript of the show, and produces a quiz in which the user needs to guess the character appearing in the program who said that short sentence. Another use case includes the user giving a rating to the monologue or dialogue of any character(s) appearing in a program and/or attaching an icon with an emotion attribute, and sharing the rating on social networks.

Other embodiments of the present invention enable a form of augmented reality by producing a real-time overlay of relevant content superimposed on (or presented in proximity to) the broadcast content displayed on the CEN device. For example, a viewer watching a TV show could be presented with details of the show, the cast of characters, clickable banners, details of the actors, and other additional material that is an extension of the show while the show is being broadcast. Such an augmented-reality overlay changes over time in correspondence with the broadcast.

Other embodiments of the present invention enable recognition of TV ads and provide options for immediate call-to-action on the device. In preferred implementations of such embodiments, the system identifies in real-time a commercial being broadcast, and provides the user with a call-to-action service on the device. Examples of such call-to-action services include:

1. an offer from the same advertiser which provides the user the ability to "click-and-call," register contact details, or send an e-mail to receive additional information;
2. an offer from other companies offering the product or the category of products advertised in the commercial which provides the user the ability to click-and-call, register contact details, or send an e-mail to receive additional information;
3. a localized offer for the same services as above, but personalized to the viewer based on identifying the localization of the user's device;
4. an offer search on the device for promotions, coupons, and/or e-commerce offers related to the advertiser, the product, or the category of the product advertised in the commercial;
5. a group-buying connection with other users looking for the same product or category of products in order to get a group discount; and
6. usage statistics in which call-to-action services are mapped to a user's profiles, time of day, location, and other contextual information provided by the user and/ or the device.

Other embodiments of the present invention enable Action-Response Camera-Capture (ARCC) for triggering delivery of VSCC. ARCC involves a response or reaction of the user (based on a change on the device's sensors) to a VSCC which is used to trigger delivery of relevant content to the device. For example, the CEN device detects an image via VSCC. As part of a game, the user is asked to perform a task in order to trigger the next content to be delivered. Examples of task to be performed include: tapping a touchscreen of the device, shaking the device having an accelerometer, gyroscope, or other movement sensors, voting in a poll, and answering a quiz. A similar process also applies when the device needs to be pointed at a specific region of the video-signal surface, or detect specific objects within the video-feed content (e.g., faces, shapes and colors, logos).

Embodiments of the present invention utilize characteristic identifiers of the video-signal surface (or screen frame), such as a 16:9 or 4:3 geometric ratio, for example. Embodiments of the present invention can perform fast VSCC detection, which allows for real-time implementation. Further embodiments enable image jitter, due to a user shaking or moving the CEN device during capture of the background scene with the video-signal surface, to be compensated for via capture stabilization.

Therefore, according to the present invention, there is provided for the first time a method for obtaining a Video-Signal Camera Capture (VSCC) from a background scene, the method including the steps of: (a) pointing a camera-enabled (CEN) device at a video-signal surface; (b) detecting a location of the video-signal surface in the background scene on the CEN device; and (c) extracting at least one frame from the detected video-signal surface.

Preferably, the method further includes the step of: (d) displaying at least one graphic indication on the detected video-signal surface on the CEN device.

Preferably, the method further includes the steps of: (d) during the step of extracting, splitting at least one respective color image of at least one frame into at least two respective channels each having a respective threshold value; (e) determining whether a previous channel and a previous threshold value from a previous frame were successful in detecting at least one quadrangle; (f) if the step of determining was successful, skipping to the step (h); (g) choosing at least one alternate respective channel having a respective new threshold value, wherein at least one alternate respective channel is at least one new respective channel or the previous channel having a respective different threshold value; (h) detecting at least one quadrangle in one of at least two channels using the previous channel and the previous threshold value, or using at least one alternate respective channel and the respective threshold value; (i) if the step of detecting at least one quadrangle was successful, storing an indicator of which channel was successful and a respective successful threshold value; (j) if the step of detecting at least one quadrangle was not successful, iterating the steps (g)-(i); and (k) providing respective coordinates for each detected quadrangle.

Most preferably, the step of detecting at least one quadrangle includes the steps of: (i) detecting at least one connected component in the color image; (ii) approximating each contour of at least one connected component with at least one primary polygon; (iii) determining whether at least one primary polygon is a convex quadrangle; (iv) if at least one primary polygon is a convex quadrangle, proceeding to the step of storing; (v) if at least one primary polygon is not a convex quadrangle, finding a convex hull of at least one connected component; (vi) approximating each convex hull with at least one secondary polygon; and (vii) proceeding to the step of storing.

Most preferably, the step of determining is terminated upon finding a first match.

Preferably, the method further includes the steps of: (d) obtaining at least one image from at least one extracted frame; (e) computing at least one compact signature from at least one image; (f) comparing at least one compact signature with at least one stored compact signature in a database; and (g) determining whether at least one match was found between at least one compact signature and at least one stored compact signature.

Most preferably, the step of determining is terminated upon finding a first match.

Most preferably, the method further includes the step of: (i) storing the database on the CEN device for performing the step of comparing and the step of determining.

Most preferably, the step of comparing and the step of determining are performed by transferring at least one compact signature to a remote entity for providing at least one match.

Preferably, the method further includes the steps of: (d) generating a video from at least two extracted frames; (e) computing at least one compact video signature from the video; (f) comparing at least one compact video signature with at least one stored signature in a database; and (g) determining whether at least one match was found between at least one compact video signature and at least one stored signature.

Preferably, the method further includes the steps of: (d) determining whether at least one frame is at least one color image; (e) if at least one frame is not at least one color image, skipping to the step of initializing; (f) if at least one frame is at least one color image, converting at least one color image into at least one greyscale image; (g) initializing at least one initially-empty signature string for at least one greyscale image; (h) setting at least one scale level "L" for at least one greyscale image; (i) dividing at least one greyscale image into at least one L×L rectangular subdivision, wherein at least one subdivision includes at least one sub-image; (j) generating at least one image signature string for at least one sub-image; (k) appending at least one image signature string to at least one initially-empty signature string; (l) iterating the steps of (h)-(j) for all values of at least scale level L; and (m) providing a full signature string upon processing at a maximum scale level of at least one scale level L.

Preferably, the step of generating at least one image signature string includes the steps of: (i) determining whether a left sum of all pixels in the left half of at least one sub-image is less than a right sum of all pixels in the right half of at least one sub-image; (ii) if the left sum is less than the right sum, appending a 1-bit to at least one image signature string; (iii) if the left sum is greater or equal than the right sum, appending a 0-bit to at least one image signature string; (iv) respectively iterating the steps (i)-(iii) for a respective top sum of all pixels in the top half of at least one sub-image, and a respective bottom sum of all pixels in the top half of at least one sub-image; (v) respectively iterating the steps (i)-(iii) for a respective first diagonal sum of all pixels in the top-left quarter and bottom-right quarter of at least one sub-image, and a respective second diagonal sum of all pixels in the top-right quarter and bottom-left quarter of at least one sub-image; (vi) respectively iterating the steps (i)-(iii) for a respective middle-horizontal sum of all pixels in the middle horizontal-section of at least one sub-image, and a respective side-horizontal sum of all pixels in the left horizontal-section and right horizontal-section of at least one sub-image; and (vii) respectively iterating the steps (i)-(iii) for a respective middle-vertical sum of all pixels in the middle vertical-section of at least one subdivision and a respective side-vertical sum of all pixels in the top vertical-third and bottom vertical-section of at least one subdivision.

Preferably, the method further includes the steps of: (d) during the step of extracting, obtaining at least one greyscale frame from at least one frame; (e) detecting at least two vertical-edge segments and at least one horizontal-edge segment, or at least one vertical-edge segment and at least two horizontal-edge segments; (f) selecting only segments from the vertical-edge segments having one endpoint above the image center and one endpoint below the image center; (g) drawing at least one selected vertical segment on a black image; (h) irrespective of the step of selecting only segments from the vertical-edge segments, selecting only segments from the horizontal-edge segments having one endpoint left of the image center and one endpoint right of the image center; (i) drawing at least one selected horizontal segment on the black image; (j) performing morphological dilation on the black image to connect at least one selected vertical segment and at least one selected horizontal segment; and (k) extracting at least one quadrangle from the black image.

Most preferably, the step of extracting at least one quadrangle from the black image includes the steps of: (i) detecting at least one connected component in the black image; (ii) approximating each contour of at least one connected component with at least one primary polygon; (iii) determining whether at least one primary polygon is a convex quadrangle; (iv) if at least one primary polygon is a convex quadrangle, storing at least one primary polygon; (v) if at least one primary polygon is not a convex quadrangle, finding a convex hull of at least one connected component; (vi) approximating each convex hull with at least one secondary polygon; (vii) determining whether at least one secondary polygon is a convex quadrangle; (viii) if at least one secondary polygon is a convex quadrangle, storing at least one secondary polygon; (ix) if at least one second polygon is not a convex quadrangle; (x) determining whether at least one secondary polygon is a triangle; (xi) if at least one secondary polygon is a triangle, determining whether an angle of the triangle is close to 90 degrees; (xii) if the angle is close to 90 degrees, determining whether a hypotenuse center of the triangle is close to an image center of the black image; (xiii) if the hypotenuse center is close to the image center, adding a fourth point to at least one secondary polygon to complete a quadrangle; and (xiv) providing respective coordinates for each detected quadrangle.

According to the present invention, there is provided for the first time a method for comparing a VSCC signature of a Video-Signal Camera Capture (VSCC) from a background scene to real-time signatures, residing on a remote server, created from a video stream, the method including the steps of: (a) extracting relevant metadata from the video stream; (b) obtaining relevant source metadata corresponding to the video stream from at least one source other than the video stream; (c) computing at least one compact server signature from the video stream; and (d) storing at least one compact server signature in a database.

Preferably, the step of storing includes storing at least one compact server signature in the database with the relevant metadata and/or the relevant source metadata.

Preferably, the method further includes the steps of: (e) upon receiving a client request having at least one compact client signature, comparing at least one compact client signature with at least one stored compact server signature in the database; and (f) determining whether at least one match was found between at least one compact client signature and at least one stored compact server signature; and (g) fulfilling the client request by providing at least one match.

Preferably, the relevant metadata and/or the relevant source metadata are selected from the group consisting of: a video-content channel, a video-content program, a program type, a program detail, a cast detail, a subtitle, a relevant ad, a relevant promotion, a viewer activity, a viewer comment, a viewer rating, a viewing statistic, content for a quiz, content for a vote, and content for a call-to-action.

According to the present invention, there is provided for the first time a method device for obtaining a Video-Signal Camera Capture (VSCC) from a background scene, the device including: (a) a camera module for detecting a location of a video-signal surface in a background scene on the device; and (b) a processing module for: (i) extracting at least one frame from the detected video-signal surface; (ii) obtaining at least one image from at least one extracted frame; and (iii) computing at least one compact signature from at least one image.

According to the present invention, there is provided for the first time a method system for obtaining a Video-Signal Camera Capture (VSCC) from a background scene, the device including: (a) a server processor for receiving at least one client request having at least one compact client signature; (b) a compact-signature generator for generating compact video-provider signatures; (c) a metadata-assigning module for assigning metadata from a metadata provider; (d) a video-index repository for storing the compact video-provider signatures; (e) a real-time comparator for comparing at least one compact client signature with at least one stored compact video-provider signature in the video-index repository; and (f) an analysis module for determining whether at least one match was found between at least one compact client signature and at least one stored compact video-provider signature; and (g) a fulfillment module for fulfilling the client request by providing at least one match.

According to the present invention, there is provided for the first time a method non-transitory computer-readable medium, having computer-readable code embodied on the non-transitory computer-readable medium, the computer-readable code including: (a) program code for detecting a location of a video-signal surface in a background scene on a camera-enabled (CEN) device; (b) program code for extracting at least one frame from the detected video-signal surface; (c) program code for obtaining at least one image from at least one extracted frame; and (d) program code for computing at least one compact signature from at least one image.

According to the present invention, there is provided for the first time a method non-transitory computer-readable medium, having computer-readable code embodied on the non-transitory computer-readable medium, the computer-readable code including: (a) program code for receiving at least one client request having at least one compact client signature; (b) program code for generating compact video-provider signatures; (c) program code for assigning metadata from a metadata provider; (d) program code for storing the compact video-provider signatures; (e) program code for comparing at least one compact client signature with at least one stored compact video-provider signature in the video-index repository; and (f) program code for determining whether at least one match was found between at least one compact client signature and at least one stored compact video-provider signature; and (g) program code for fulfilling the client request by providing at least one match.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to devices, systems, methods, and media for detecting, indexing, and comparing video signals from a video display in a background scene using a camera-enabled device. The principles and operation for providing such devices, methods, and media, according to the present invention, may be better understood with reference to the accompanying description and the drawings.

Figure 1:
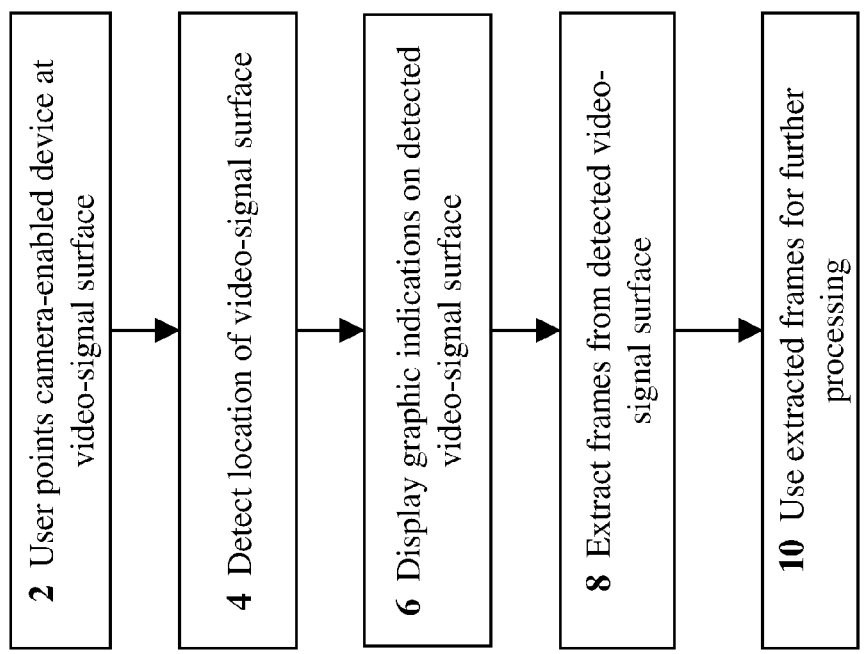
FIG. 1 is a simplified flowchart of the major process steps for obtaining a Video-Signal Camera-Capture (VSCC) from a background scene, according to preferred embodiments of the present invention.

Referring now to the drawings, FIG. 1 is a simplified flowchart of the major process steps for obtaining a Video-Signal Camera-Capture (VSCC) from a background scene, according to preferred embodiments of the present invention. The process begins when a user points a CEN device at a background scene (e.g., a room or space) where there is a surface with a video signal (Step 2). The CEN device captures the space including the surface with the video signal. The system detects the location of the video signal surface from the camera-capture output (Step 4).

The system then displays graphic indications on the detected video-signal surface to notify the user that the system has detected the video signal within the camera-capture output (Step 6). The system extracts the frames of the video signal from the detected video-signal surface (Step 8). From the extracted frames, the system is able to create fixed images cropped to an appropriate size. The extracted frames can then be used for further processing (Step 10).

Figure 2:
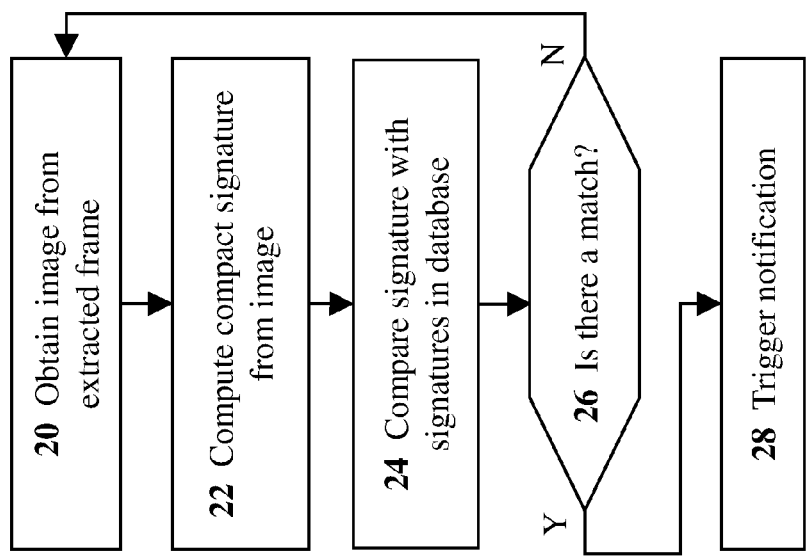
FIG. 2 is a simplified flowchart of the major process steps for computing a compact image signature of a VSCC on a camera-enabled (CEN) device, according to preferred embodiments of the present invention.

FIG. 2 is a simplified flowchart of the major process steps for computing a compact image signature of a VSCC on a CEN device, according to preferred embodiments of the present invention. The process starts with the system detecting and extracting the video-signal surface using a CEN device (e.g., a smartphone, a tablet PC, and other types of devices having a camera) as described in the VSCC process of FIG. 1. Once the system produces the extracted frames, images can be obtained from the frames (Step 20). The system computes locally (i.e., in the CEN device) a compact signature from the visual characteristics of the image, and represents the video with the compact signature (having a much smaller file size than the original image) (Step 22).

Figure 10:
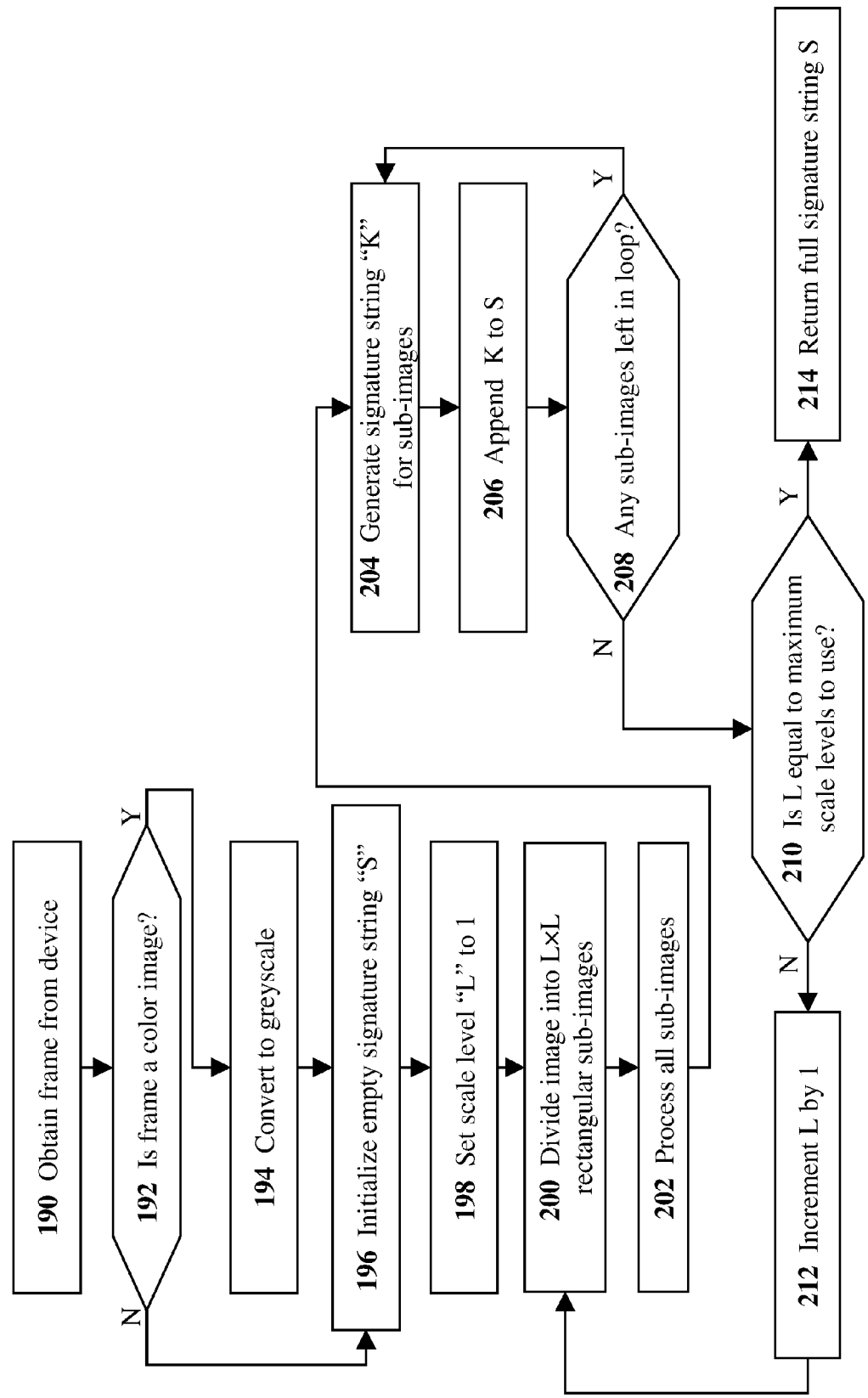
FIG. 10 is a simplified flowchart of the major process steps for creating a compact signature from an image, according to preferred embodiments of the present invention.
Figure 11:
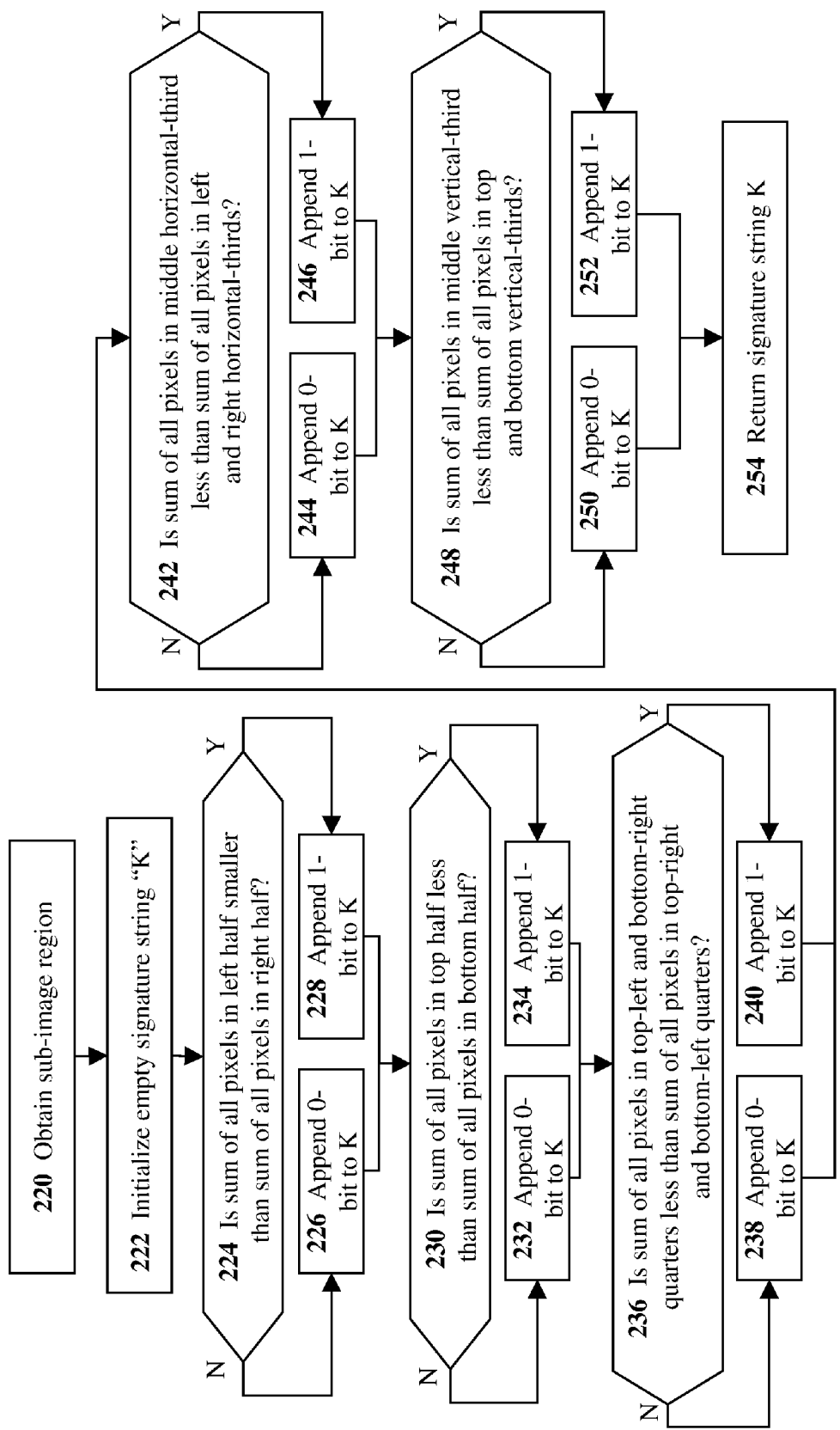
FIG. 11 is a simplified flowchart of the major process steps for creating a compact signature from a sub-image, according to preferred embodiments of the present invention.

Exemplary embodiments for producing such compact signatures are described with regard to FIGS. 10 and 11. In such embodiments, signature comparison is performed using the well-know Hamming distance between bit-strings (i.e., the number of bits that are different between 2 bit-strings). The larger the Hamming distance is, the worse the match is between the signatures.

The compact signature of the video-signal image enables the represented video content to be described, indexed, identified, presented, compared, and/or matched with other video or visual content. The system then compares the compact signature with signatures in a database (locally or remotely available) (Step 24).

The system searches for a matching signature (Step 26). If a match is detected, a notification is triggered for an application running on the device (Step 28). If a match is not detected, then the process returns to Step 20 to obtain a new image from the extracted frames.

It is noted that in frames in which multiple candidates are produced, signatures may be computed for each candidate, and matching is performed against all the candidate signatures. Signature comparisons can also be performed by comparing each fingerprint signature computed from the video-signal surface to all the stored signatures stored in the database. This provides a matching time that grows linearly with the number of signatures in the database. In alternative implementations of the present invention, a greedy-matching scheme provided excellent results. In such a scheme, once a sufficiently-close match is found, no more signatures are compared.

Figure 3:
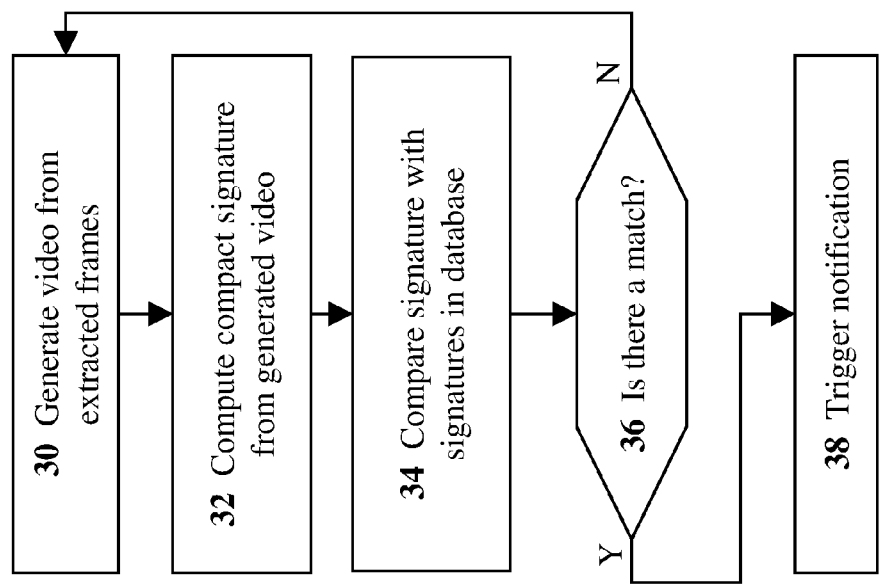
FIG. 3 is a simplified flowchart of the major process steps for computing a compact video signature of a VSCC on a CEN device, according to preferred embodiments of the present invention.

FIG. 3 is a simplified flowchart of the major process steps for computing a compact video signature of a VSCC on a CEN device, according to preferred embodiments of the present invention. The process starts with the system generating video from the extracted frames produced by the VSCC process of FIG. 1 (Step 30). The system computes locally a compact video signature from the generated video, and represents the video with the compact video signature (having a much smaller file size than the generated video) (Step 32).

The system then compares the compact video signature with signatures in a database (locally or remotely available) (Step 34). The system searches for a matching signature (Step 36). If a match is detected, a notification is triggered for an application running on the device (Step 38). If a match is not detected, then the process returns to Step 30 to generate a video from a new set of extracted frames.

In frames in which multiple candidates are produced, signatures may be computed for each candidate, and matching is performed against all the candidate signatures. Signature comparisons can also be performed by comparing each fingerprint signature computed from the video-signal surface to all the stored signatures stored in the database. This provides a matching time that grows linearly with the number of signatures in the database. In alternative implementations of the present invention, a greedy-matching scheme provided excellent results. In such a scheme, once a sufficiently-close match is found, no more signatures are compared.

Figure 4:
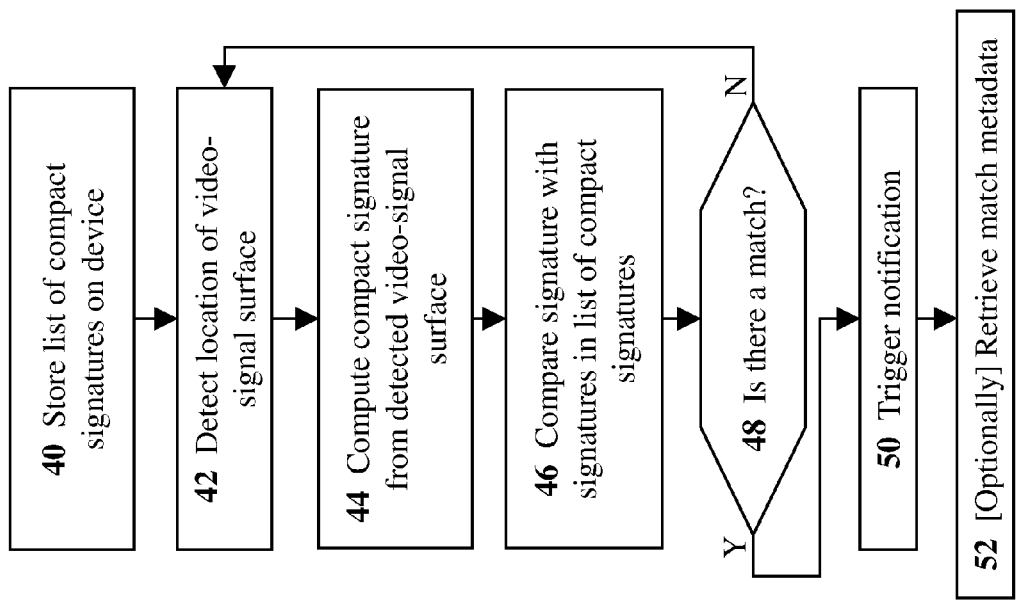
FIG. 4 is a simplified flowchart of the major process steps for comparing the signature of a VSCC to other signatures on a CEN device, according to preferred embodiments of the present invention.

FIG. 4 is a simplified flowchart of the major process steps for comparing the signature of a VSCC to other signatures on a CEN device, according to preferred embodiments of the present invention. The process starts with the system storing a list of compact signatures on the CEN device (Step 40). The system detects and extracts the video-signal surface using the CEN device as described in the VSCC process of FIG. 1 (Step 42). The system computes a compact video signature as described in the video-signature process of FIG. 3 (Step 44).

The system compares the recently-created compact video signature to the other compact video signatures locally stored on the device (Step 46). The system searches for a matching signature (Step 48). If a match is found, a notification is triggered for an application running on the device (Step 50). Optionally, the metadata from the signature match in the list can be retrieved (Step 52). If a match is not detected, then the process returns to Step 42.

In frames in which multiple candidates are produced, signatures may be computed for each candidate, and matching is performed against all the candidate signatures. Signature comparisons can also be performed by comparing each fingerprint signature computed from the video-signal surface to all the stored signatures stored in the database. This provides a matching time that grows linearly with the number of signatures in the database. In alternative implementations of the present invention, a greedy-matching scheme provided excellent results. In such a scheme, once a sufficiently-close match is found, no more signatures are compared.

Figure 5:
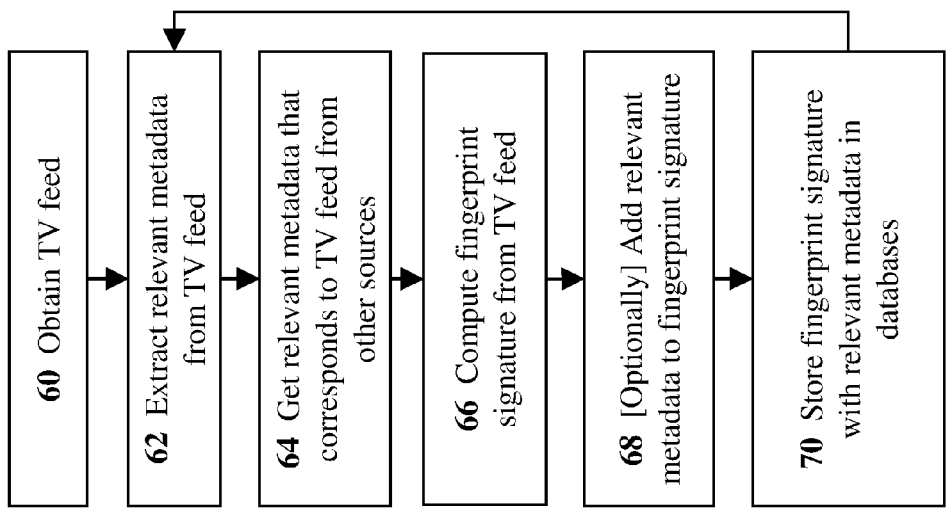
FIG. 5 is a simplified flowchart of the major process steps for comparing the signature of a VSCC to a group of compact signatures created in real time for a video stream in a remote server, according to preferred embodiments of the present invention.

FIG. 5 is a simplified flowchart of the major process steps for comparing the signature of a VSCC to a group of compact signatures created in real-time for a video stream in a remote server, according to preferred embodiments of the present invention. A TV feed is used as an exemplary video stream in describing the process steps. The process starts by obtaining the TV feed (or other video stream) (Step 60). The system extracts relevant metadata from the TV feed (Step 62). The system then extracts relevant metadata that corresponds to the TV feed from other sources (Step 64).

For example, such relevant metadata can include: electronic program guide, time, title of show, thumbnail image, show details, subtitles, detection of objects within the video-feed's visual and audio content (e.g., faces, written text displayed within the video, specific objects, products displays, logos, keywords, promotions, commercials, and jingles).

A fingerprint signature is computed from the TV feed (Step 66), and, optionally, relevant metadata is added to the fingerprint signature (Step 68). The fingerprint signature is then stored with the relevant metadata in databases (Step 70). The system then repeats the process by returning to Step 62.

Figure 6:
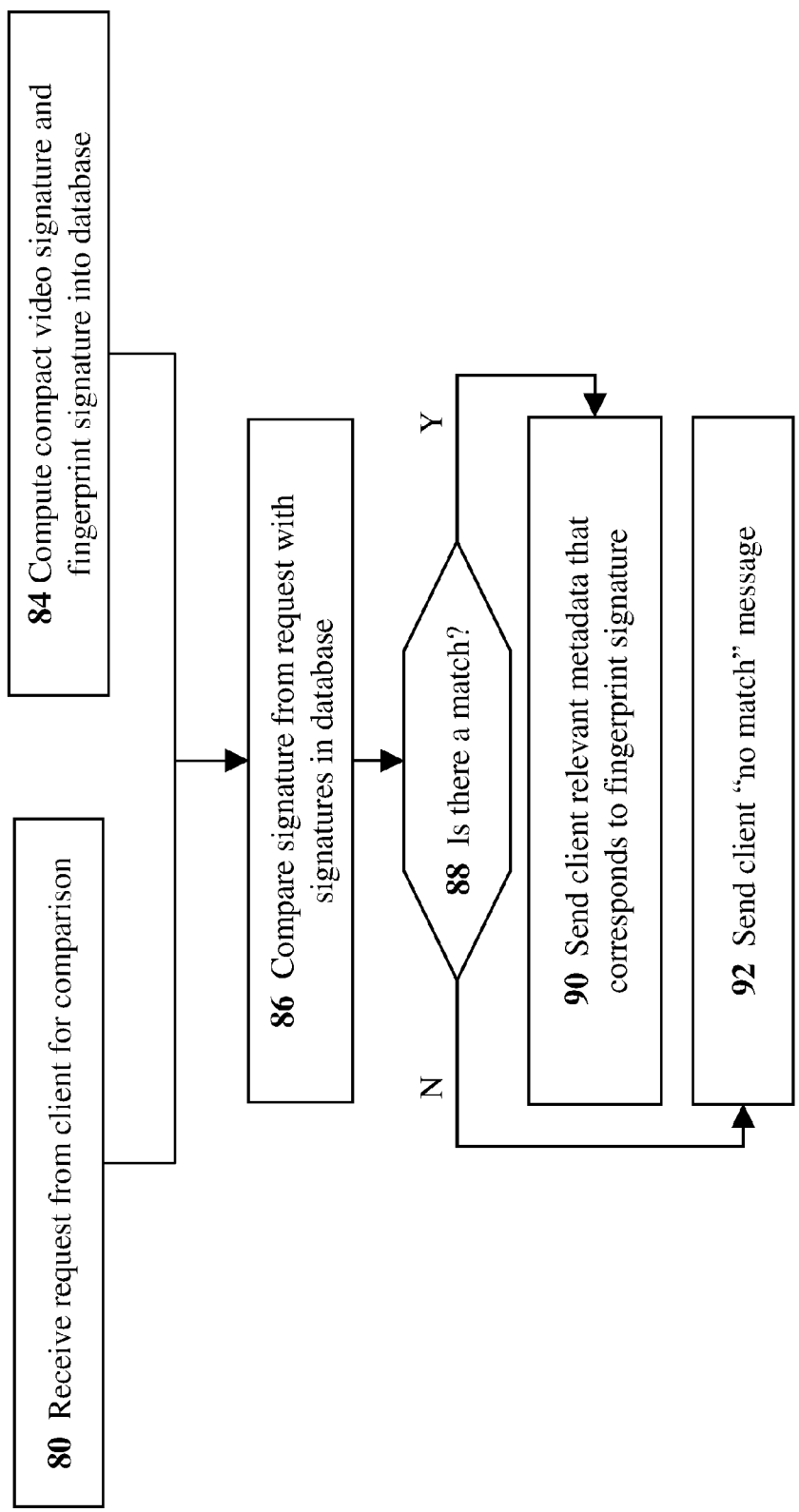
FIG. 6 is a simplified flowchart of the major process steps for performing a back-office comparison, according to preferred embodiments of the present invention.

FIG. 6 is a simplified flowchart of the major process steps for performing a back-office comparison, according to preferred embodiments of the present invention. The system first receives the video signal from a video feed (e.g., from a digital-video television broadcast, cable TV, satellite TV, online streaming channels, a DVD, or any other video source). The process starts with the system receiving a request from a client for a comparison (Step 80).

The system then computes the compact video signature created on the device (via the process of FIG. 3) with the fingerprint signatures computed from the video feed (via the process of FIG. 5) which include the relevant metadata (Step 84). The system sends the metadata for the device, and the signature from the request is compared with the signatures in the database (Step 86). The system searches for a matching signature (Step 88). If a match is found, the relevant metadata that corresponds to the fingerprint signature is sent to the client (Step 90). If a match is not found, then a "no match" notification message is sent to the client (Step 92).

Figure 7:
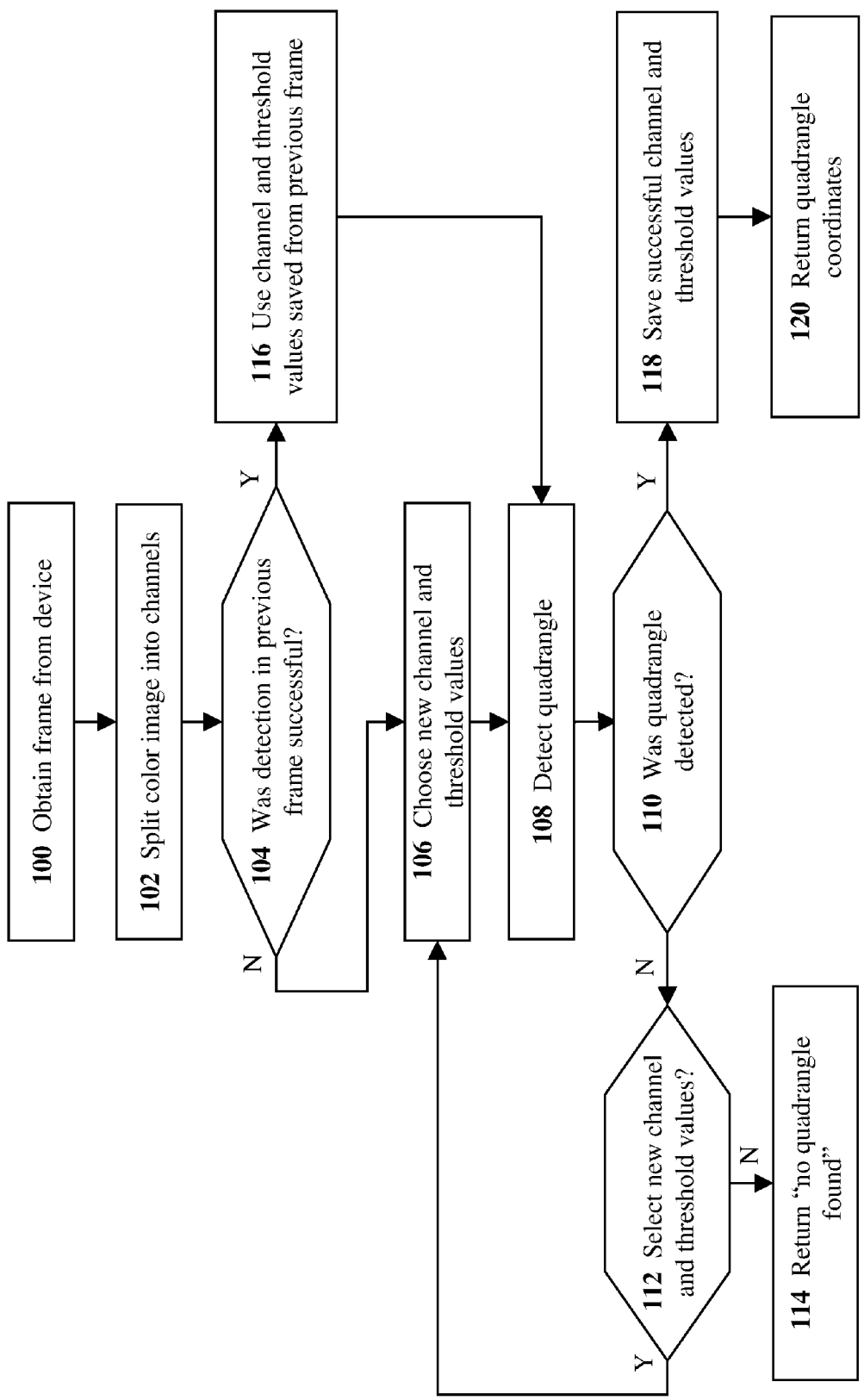
FIG. 7 is a simplified flowchart of the major process steps for detecting a video-signal surface from a television or video display, according to preferred embodiments of the present invention.

FIG. 7 is a simplified flowchart of the major process steps for detecting a video-signal surface from a television or video display, according to preferred embodiments of the present invention. FIG. 7 represents an exemplary embodiment for detecting and extracting the video-signal surface. It is noted that other approaches may be implemented to achieve the same results.

The process starts with the system detecting and extracting the video-signal surface using the CEN device as described in the VSCC process of FIG. 1 (Step 100). The color image is split into channels (Step 102). The system determines whether detection was successful for the previous frame (Step 104). If detection was not successful, a new channel and threshold values are selected (Step 106). The system tries to detect a quadrangle in the frame (Step 108), and verifies whether a quadrangle was detected (Step 110). It is noted that the quadrangle extraction in Step 108 may produce more than one candidate quadrangle.

If no quadrangle was detected, then the system decides whether to select a new channel and threshold values (Step 112). The system either returns to Step 106, or returns a "no quadrangle found" message (Step 114). If frame detection was successful in Step 104, the system uses the channel and threshold values saved from the previous frame (Step 116), and the process continues with Step 108. If a quadrangle was detected in Step 110, then the system saves the successful channel and threshold values (Step 118), and returns the quadrangle coordinates (Step 120).

Figure 8:
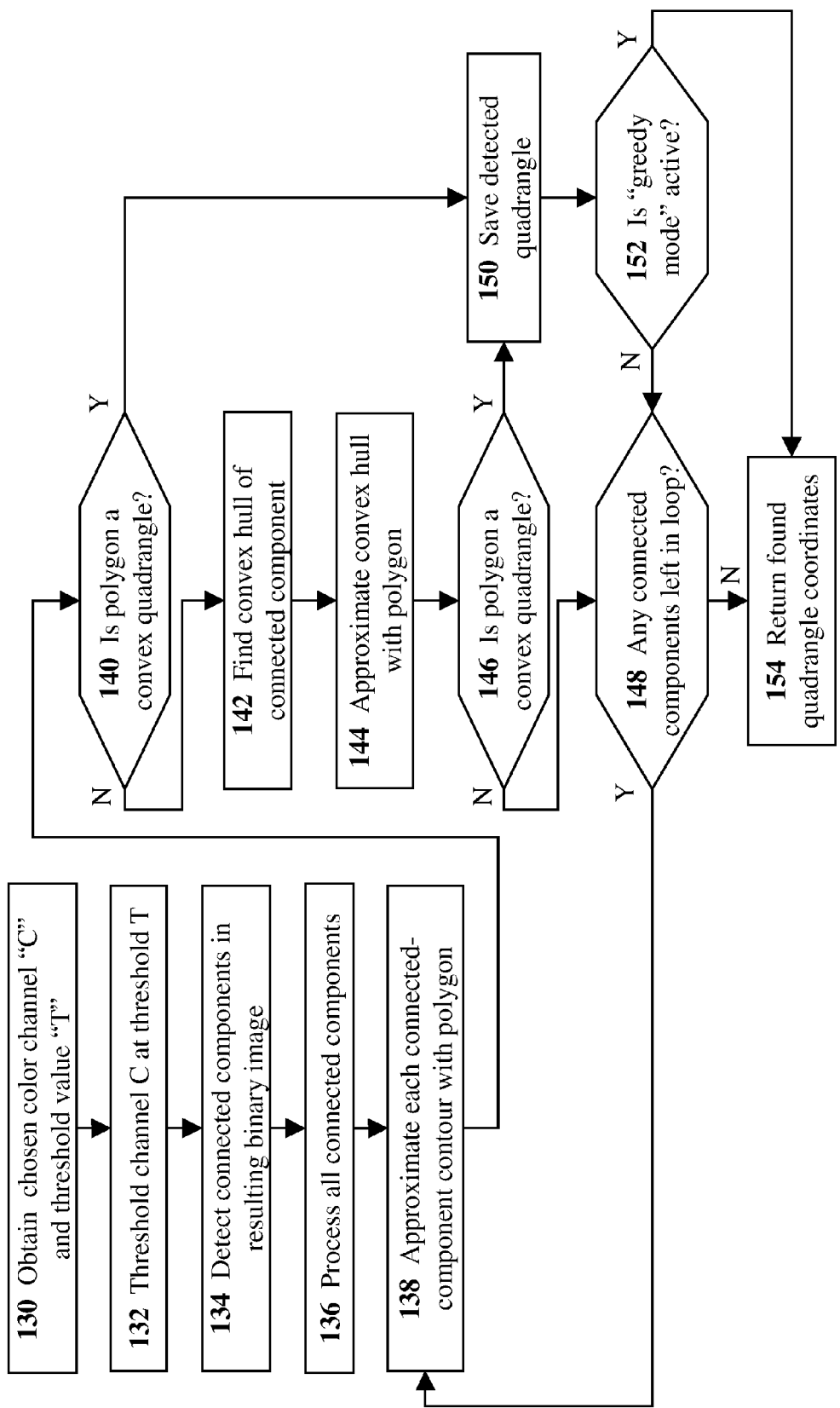
FIG. 8 is a simplified flowchart of the major process steps for detecting quadrangles from a television or video display, according to preferred embodiments of the present invention.
Figure 12:
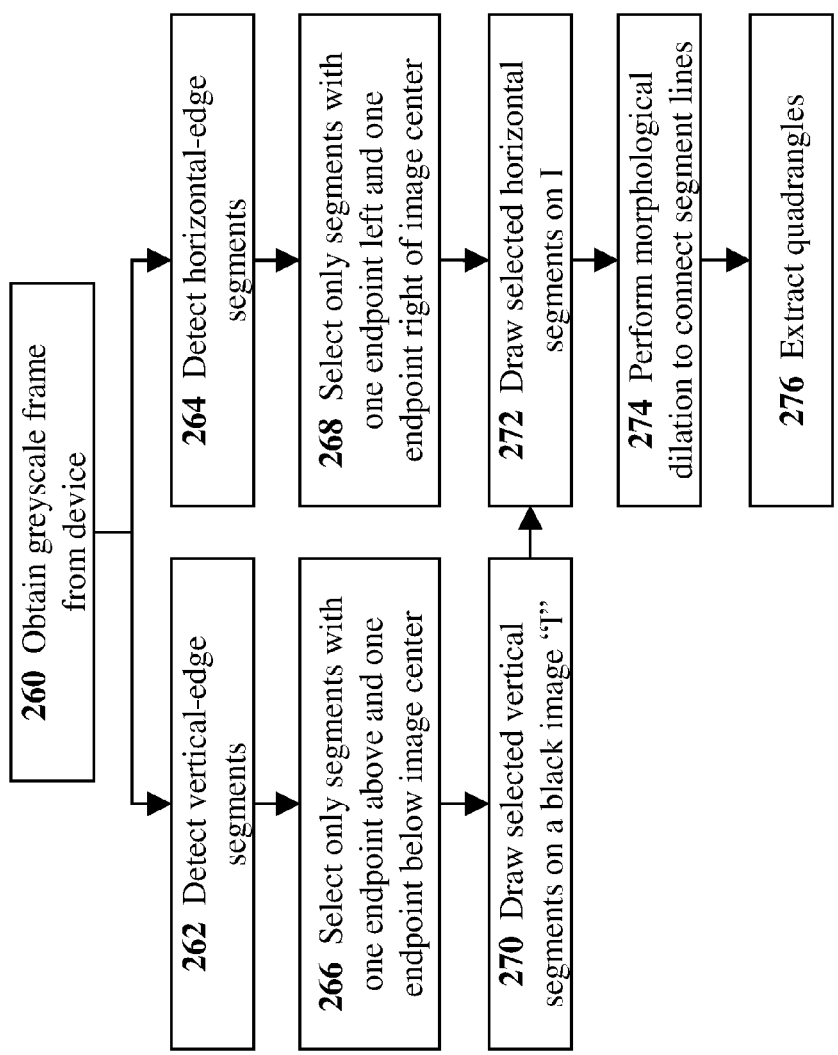
FIG. 12 is a simplified flowchart of the major process steps for detecting a video-signal surface from a television or video display, according to alternate embodiments of the present invention.
Figure 13:
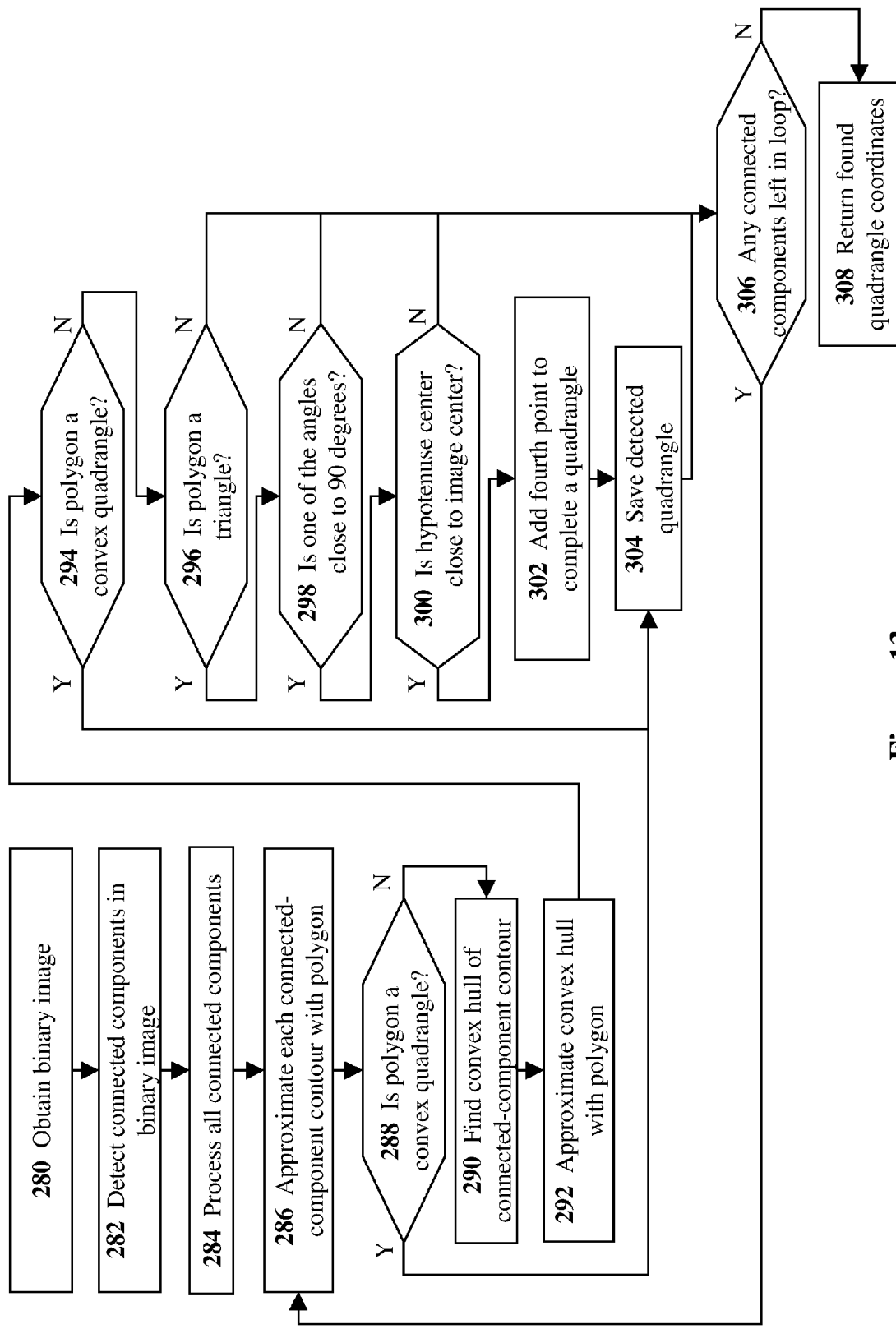
FIG. 13 is a simplified flowchart of the major process steps for detecting quadrangles from a television or video display, according to alternate embodiments of the present invention.

FIG. 8 is a simplified flowchart of the major process steps for detecting quadrangles from a television or video display, according to preferred embodiments of the present invention. FIG. 8 represents an exemplary embodiment for detecting quadrangles. It is noted that other approaches may be implemented to achieve the same results. FIGS. 12 and 13 provide alternate embodiments for extracting quadrangles corresponding to the TV or video display.

The process of FIG. 8 starts with the system obtaining a chosen color channel "C" and threshold value "T" (Step 130). Channel C is thresholded at threshold T (Step 132), and the connected components (e.g., clusters of contacting neighboring foreground pixels as used in image-processing literature) in the resulting binary image are detected (Step 134). All connected components are then iteratively processed (Step 136), and each connected-component contour is approximated with a polygon (Step 138). Step 138 may produce more than one candidate polygon.

The system then determines whether the polygon is a convex quadrangle (Step 140). If the polygon is not a convex quadrangle, the system finds a convex hull (as used in computational geometry) of the connected component (Step 142), and approximates the convex hull with a polygon (Step 144). The system checks whether the polygon is a convex quadrangle (Step 146). If the polygon is not a convex quadrangle, the system checks whether any connected components are left in the process loop (Step 148). If there are connected components left in the process loop, the process returns to Step 138.

If the polygon is a convex quadrangle in Steps 140 or 146, the system saves the detected quadrangle (Step 150), and determines whether "greedy mode" (i.e., searching for only the first detected convex quadrangle) is active (Step 152). If greedy mode is not active, the process continues to Step 148. If greedy mode is active, or if there are no connected components left in the process loop in Step 148, the system returns any found quadrangle coordinates (Step 154).

Figure 9:
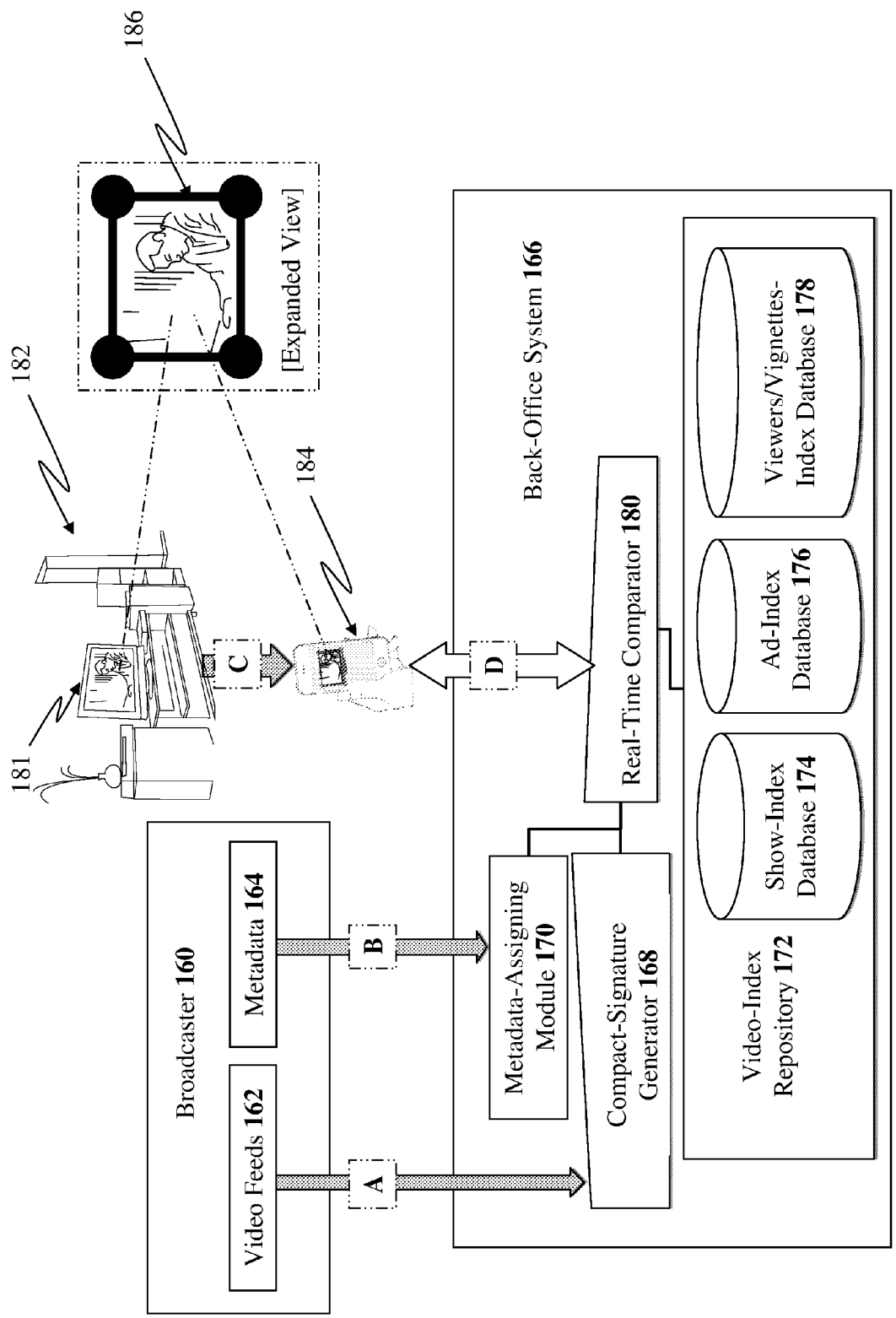
FIG. 9 is a simplified schematic diagram of the system architecture for obtaining a VSCC from a background scene, according to preferred embodiments of the present invention.

FIG. 9 is a simplified schematic diagram of the system architecture for obtaining a VSCC from a background scene, according to preferred embodiments of the present invention. A broadcaster 160 (e.g., TV, cable, and satellite) transmits video feeds 162 (e.g., DVB-T, ATSC, and TV) and metadata 164 (e.g., electronic program guide and subtitles) via transmissions A and B, respectively, to a back-office system 166. Back-office system 166 includes a compact-signature generator 168 for computing and storing compact signatures, a metadata-assigning module 170 for assigning relevant metadata, a video-index repository 172 having various databases (e.g., a show-index database 174, an ad-index database 176, and a viewers/vignettes-index database 178), and a real-time comparator 180. Vignettes are short video clips such as a movie trailer.

A video display 181 in a background scene 182 displays the content of broadcaster 160. A CEN device 184 captures background scene 182 including video display 181 via transmission C. CEN device 184 detects the displayed content, extracts the frames from the content, and computes the compact signatures of the frames. CEN device 184 then sends the compact signatures to real-time comparator 180 via transmission D.

An expanded view in FIG. 9 of video display 181 and the display of CEN device 184 shows a quadrangle 186 which is detected from video display 181, and extracted from background scene 182 on CEN device 184 in order to process the captured images of the content into frames. Real-time comparator 180 then transmits relevant assigned metadata to CEN device 184 which can be combined with the images, and shared with contacts of the user in social networks.

FIG. 10 is a simplified flowchart of the major process steps for creating a compact signature from an image, according to preferred embodiments of the present invention. The process starts with the system obtaining a frame from the CEN device (Step 190), and determining whether the frame is a color image (Step 192). If the frame is a color image, the system converts the frame to a greyscale image (Step 194). If the frame is not a color image, or after converting the frame to a greyscale image, the system then initializes an empty signature string "S" (Step 196).

The system then sets the scale level "L" to one (Step 198), divides the image into L×L rectangular sub-images (Step 200), iteratively processes all sub-images (Step 202), generates signature string "K" for each sub-image (Step 204), and appends K to S (Step 206). The system then determines whether any sub-images are left in the process loop (Step 208). If there are sub-images left in the process loop, the process returns to Step 204. If there are no sub-images left in the process loop, the system checks if L is equal to the maximum scale levels to use (Step 210). If L is not equal to the maximum scale levels, the system increment L by one (step 212), and returns to Step 200. If L is equal to the maximum scale levels, the system returns the full signature string S (Step 214).

The maximum scale levels to use can be chosen based on the input image resolution, and the amount of fine details one is interested in capturing. In some exemplary implementations, excellent results were achieved with a maximum scale level of 6.

It is noted that whenever a fingerprint signature is sent to a remote server (as described with regard to FIG. 5), the fingerprint signature may be encoded before transmission. This encoding depends on the desired platform, and may provide various advantages. As an example, consider the case of binary strings of bits as described with regard to FIG. 10. Possible transmission encoding could include, but is not limited to, compression, character string representation (which uses a reduced character set, for example 64 or 85 characters out of the 128 ANSI ASCII, such that they may be represented compactly in human-readable and platform-independent form), or in other text-based data formats such as XML or JSON. In the case of text-based data formats, the character encoding may also avoid special characters specific to the chosen format. Optionally, a binary encoding may also be used which may be either platform dependent or platform independent.

FIG. 11 is a simplified flowchart of the major process steps for creating a compact signature from a sub-image, according to preferred embodiments of the present invention. The process starts with the system obtaining the sub-image region (Step 220), and initializing an empty signature string "K" (Step 222). The system then determines whether the sum of all the pixels in the left half is less than the sum of all the pixels in the right half (Step 224).

If the sum of all the pixels in the left half is not less than the sum of all the pixels in the right half, then the system appends a 0-bit to K (Step 226), and continues to Step 230. If the sum of all the pixels in the left half is less than the sum of all the pixels in the right half, then the system appends a 1-bit to K (Step 228), and continues to Step 230.

The system then determines whether the sum of all the pixels in the top half is less than the sum of all the pixels in the bottom half (Step 230). If the sum of all the pixels in the top half is not less than the sum of all the pixels in the bottom half, then the system appends a 0-bit to K (Step 232), and continues to Step 236. If the sum of all the pixels in the top half is less than the sum of all the pixels in the bottom half, then the system appends a 1-bit to K (Step 234), and continues to Step 236.

The system then determines whether the sum of all the pixels in the top-left and bottom-right quarters is less than the sum of all the pixels in the top-right and bottom-left quarters (Step 236). If the sum of all the pixels in the top-left and bottom-right quarters is not less than the sum of all the pixels in the top-right and bottom-left quarters, then the system appends a 0-bit to K (Step 238), and continues to Step 242. If the sum of all the pixels in the top-left and bottom-right quarters is less than the sum of all the pixels in the top-right and bottom-left quarters, then the system appends a 1-bit to K (Step 240), and continues to Step 242.

The system then determines whether the sum of all the pixels in the middle horizontal-third is less than the sum of all the pixels in the left and right horizontal-thirds (Step 242). If the sum of all the pixels in the middle horizontal-third is not less than the sum of all the pixels in the left and right horizontal-thirds, then the system appends a 0-bit to K (Step 244), and continues to Step 248. If the sum of all the pixels in the middle horizontal-third is less than the sum of all the pixels in the left and right horizontal-thirds, then the system appends a 1-bit to K (Step 246), and continues to Step 248.

The system then determines whether the sum of all the pixels in the middle vertical-third is less than the sum of all the pixels in the top and bottom vertical-thirds (Step 248). If the sum of all the pixels in the middle vertical-third is not less than the sum of all the pixels in the top and bottom vertical-thirds, then the system appends a 0-bit to K (Step 250), and continues to Step 254. If the sum of all the pixels in the middle vertical-third is less than the sum of all the pixels in the top and bottom vertical-thirds, then the system appends a 1-bit to K (Step 252), and returns the signature string K which is a binary bit-string (Step 254).

FIG. 12 is a simplified flowchart of the major process steps for detecting a video-signal surface from a television or video display, according to alternate embodiments of the present invention. The process starts with the system obtaining a greyscale frame from the device (Step 260), and detecting the vertical-edge segments (Step 262) and the horizontal-edge segments (Step 264). Steps 262 and 264, as well as subsequent connected process steps, can be performed sequentially (with either one being performed first) or in parallel.

The system then selects only vertical-edge segments with one endpoint above and one endpoint below the image center (Step 266), and only horizontal-edge segments with one endpoint left and one endpoint right of the image center (Step 268). The system then draws selected vertical segments on a black image "I" (Step 270), and draws selected horizontal segments on image I (Step 272). The system then performs a morphological dilation to connect the segment lines (Step 274), and extracts the quadrangles (Step 276). Step 276 may produce more than one candidate quadrangle. A detailed process flow for the quadrangle extraction of Step 276 is described below with regard to FIG. 13.

FIG. 13 is a simplified flowchart of the major process steps for detecting quadrangles from a television or video display, according to alternate embodiments of the present invention. The process starts with the system obtaining a binary image (Step 280) with the selected edges described with regard to FIG. 12. The system detects the connected components in the binary image (Step 282), iteratively processes all connected components (Step 284), and approximates the connected-component contour with a polygon (Step 286). Step 286 may produce more than one candidate polygon.

The system then determines whether the polygon is a convex quadrangle (Step 288). If the polygon is a convex quadrangle, then the process continues to Step 304. If the polygon is not a convex quadrangle, the system finds a convex hull of each connected-component contour (Step 290), and approximates the convex hull with a polygon (Step 292).

The system then determines whether the polygon is a convex quadrangle (Step 294). If the polygon is a convex quadrangle, then the process continues to Step 304. If the polygon is not a convex quadrangle, then the system determines whether the polygon is a triangle (Step 296). If the polygon is not a triangle, then the process continues to Step 306. If the polygon is a triangle, then the system determines whether one of the angles is close to 90 degrees (Step 298). If none of the angles are close to 90 degrees, then the process continues to Step 306.

If one of the angles is close to 90 degrees, then the system determines whether the hypotenuse center is close to the image center (Step 300). If the hypotenuse center is not close to the image center, then the process continues to Step 306. If the hypotenuse center is close to the image center, then the system adds a fourth point to complete a quadrangle (e.g., a parallelogram) (Step 302), and saves the detected quadrangle (Step 304).

The system then determines whether there are any connected components left in the process loop (Step 306). If there are connected components left in the process loop, the process returns to Step 286. If there are no connected components left in the process loop, then the system returns any found quadrangle coordinates (Step 308).

In some implementations of the present invention, it is possible to provide sub-linear matching. Tree-based data-structures can provide logarithmic-time lookup and matching. In the case of binary bit-string signatures, the distance metric can be implemented using suitable candidates as described in the literature (e.g., the Hamming distance and Metric-Trees (see Wikipedia online resource listing under "Metric_tree")). In other implementations, the Cover-Tree data-structure (see Wikipedia online resource listing under "Cover_tree"—Alina Beygelzimer, Sham Kakade, and John Langford, *Cover Trees for Nearest Neighbor*, ICML 2006) provided excellent results.

While the present invention has been described with respect to a limited number of embodiments, it will be appreciated that many variations, modifications, and other applications of the present invention may be made.

What is claimed is:

1. A method for obtaining a Video-Signal Camera Capture (VSCC) from a background scene, the method comprising the steps of:
   (a) pointing a camera-enabled (CEN) device at a video-signal surface;
   (b) detecting a location of said video-signal surface in the background scene on said CEN device;
   (c) extracting at least one frame from said detected video-signal surface;
   (d) during said step of extracting, splitting at least one respective color image of said at least one frame into at least two respective channels each having a respective threshold value;
   (e) determining whether a previous channel and a previous threshold value from a previous frame were successful in detecting at least one quadrangle;
   (f) if said step of determining was successful, skipping to said step (h);
   (g) choosing at least one alternate respective channel having a respective new threshold value, wherein said at least one alternate respective channel is at least one new respective channel or said previous channel having a respective different threshold value;
   (h) detecting at least one quadrangle in one of said at least two channels using said previous channel and said previous threshold value, or using said at least one alternate respective channel and said respective threshold value;
   (i) If said step of detecting said at least one quadrangle was successful, storing an indicator of which channel was successful and a respective successful threshold value;
   (j) if said step of detecting said at least one quadrangle was not successful, iterating said steps (g)-(i); and
   (k) providing respective coordinates for each detected quadrangle.

2. The method of claim 1, the method further comprising the step of:
   displaying at least one graphic indication on said detected video-signal surface on said CEN device.

3. The method of claim 1, wherein said step of detecting said at least one quadrangle includes the steps of:
   (i) detecting at least one connected component in said color image;
   (ii) approximating each contour of said at least one connected component with at least one primary polygon;
   (iii) determining whether said at least one primary polygon is a convex quadrangle;
   (iv) if said at least one primary polygon is a convex quadrangle, proceeding to said step of storing;
   (v) if said at least one primary polygon is not a convex quadrangle, finding a convex hull of said at least one connected component;
   (vi) approximating each said convex hull with at least one secondary polygon; and
   (vii) proceeding to said step of storing.

4. The method of claim 1, wherein said step of determining is terminated upon finding a first match.

5. The method of claim 1, the method further comprising the steps of:
   obtaining at least one image from said at least one extracted frame;
   computing at least one compact signature from said at least one image;
   comparing said at least one compact signature with at least one stored compact signature in a database; and
   determining whether at least one match was found between said at least one compact signature and said at least one stored compact signature.

6. The method of claim 5, wherein said step of determining whether at least one match is found is terminated upon finding a first match.

7. The method of claim 5, the method further comprising the step of:
(i) storing said database on said CEN device for performing said step of comparing and said step of determining whether at least one match is found.

8. The method of claim 5, wherein said step of comparing and said step of determining whether at least one match is found are performed by transferring said at least one compact signature to a remote entity for providing said at least one match.

9. The method of claim 1, the method further comprising the steps of:
generating a video from at least two said extracted frames;
computing at least one compact video signature from said video;
comparing said at least one compact video signature with at least one stored signature in a database; and
determining whether at least one match was found between said at least one compact video signature and said at least one stored signature.

10. A system for obtaining a Video-Signal Camera Capture (VSCC) from a background scene, the device comprising:
(a) a server processor for receiving at least one client request having at least one compact client signature;
(b) a compact-signature generator for generating compact video-provider signatures;
(c) a metadata-assigning module for assigning metadata from a metadata provider;
(d) a video-index repository for storing said compact video-provider signatures;
(e) a real-time comparator for comparing said at least one compact client signature with at least one stored compact video-provider signature in said video-index repository;
(f) an analysis module for determining whether at least one match was found between said at least one compact client signature and said at least one stored compact video-provider signature; and
(g) a fulfillment module for fulfilling said client request by providing said at least one match.

11. A non-transitory computer-readable medium, having computer-readable code embodied on the non-transitory computer-readable medium, the computer-readable code comprising:
(a) program code for receiving at least one client request having at least one compact client signature;
(b) program code for generating compact video-provider signatures;
(c) program code for assigning metadata from a metadata provider;
(d) program code for storing said compact video-provider signatures;
(e) program code for comparing said at least one compact client signature with at least one stored compact video-provider signature in said video-index repository;
(f) program code for determining whether at least one match was found between said at least one compact client signature and said at least one stored compact video-provider signature; and
(g) program code for fulfilling said client request by providing said at least one match.

12. A method for obtaining a Video-Signal Camera Capture (VSCC) from a background scene, the method comprising the steps of:
(a) pointing a camera-enabled (CEN) device at a video-signal surface;
(b) detecting a location of said video-signal surface in the background scene on said CEN device;
(c) extracting at least one frame from said detected video-signal surface;
(d) determining whether said at least one frame is at least one color image;
(e) if said at least one frame is not at least one color image, skipping to said step of initializing;
(f) if said at least one frame is at least one color image, converting said at least one color image into at least one greyscale image;
(g) initializing at least one initially-empty signature string for said at least one greyscale image;
(h) setting at least one scale level "L" for said at least one greyscale image;
(i) dividing said at least one greyscale image into at least one L×L rectangular subdivision, wherein said at least one subdivision includes at least one sub-image;
(j) generating at least one image signature string for said at least one sub-image;
(k) appending said at least one image signature string to said at least one initially-empty signature string;
(l) iterating said steps (h)-(j) for all values of said at least scale level L; and
(m) providing a full signature string upon processing at a maximum scale level of said at least one scale level L.

13. The method of claim 12, wherein said step of generating at least one image signature string includes the steps of:
(i) determining whether a left sum of all pixels in the left half of said at least one sub-image is less than a right sum of all pixels in the right half of said at least one sub-image;
(ii) if said left sum is less than said right sum, appending a 1-bit to said at least one image signature string;
(iii) if said left sum is greater or equal than said right sum, appending a 0-bit to said at least one image signature string;
(iv) respectively iterating said steps (i)-(iii) for a respective top sum of all pixels in the top half of said at least one sub-image, and a respective bottom sum of all pixels in the top half of said at least one sub-image;
(v) respectively iterating said steps (i)-(iii) for a respective first diagonal sum of all pixels in the top-left quarter and bottom-right quarter of said at least one sub-image, and a respective second diagonal sum of all pixels in the top-right quarter and bottom-left quarter of said at least one sub-image;
(vi) respectively iterating said steps (i)-(iii) for a respective middle-horizontal sum of all pixels in the middle horizontal-section of said at least one sub-image, and a respective side-horizontal sum of all pixels in the left horizontal-section and right horizontal-section of said at least one sub-image; and
(vii) respectively iterating said steps (i)-(iii) for a respective middle-vertical sum of all pixels in the middle vertical-section of said at least one sub-image, and a respective side-vertical sum of all pixels in the top vertical-section and bottom vertical-section of said at least one sub-image.

14. A method for obtaining a Video-Signal Camera Capture (VSCC) from a background scene, the method comprising the steps of:
(a) pointing a camera-enabled (CEN) device at a video-signal surface;
(b) detecting a location of said video-signal surface in the background scene on said CEN device;

(c) extracting at least one frame from said detected video-signal surface;
(d) during said step of extracting, obtaining at least one greyscale frame from said at least one frame;
(e) detecting at least two vertical-edge segments and at least one horizontal-edge segment, or at least one vertical-edge segment and at least two horizontal-edge segments;
(f) selecting only segments from said vertical-edge segments having one endpoint above the image center and one endpoint below the image center;
(g) drawing at least one selected vertical segment on a black image;
(h) irrespective of said step of selecting only segments from said vertical-edge segments, selecting only segments from said horizontal-edge segments having one endpoint left of the image center and one endpoint right of the image center;
(i) drawing at least one selected horizontal segment on said black image;
(j) performing morphological dilation on said black image to connect said at least one selected vertical segment and said at least one selected horizontal segment; and
(k) extracting at least one quadrangle from said black image.

15. The method of claim 14, wherein said step of extracting said at least one quadrangle from said black image includes the steps of:
(i) detecting at least one connected component in said black image;
(ii) approximating each contour of said at least one connected component with at least one primary polygon;
(iii) determining whether said at least one primary polygon is a convex quadrangle;
(iv) if said at least one primary polygon is a convex quadrangle, storing said at least one primary polygon;
(v) if said at least one primary polygon is not a convex quadrangle, finding a convex hull of said at least one connected component;
(vi) approximating each said convex hull with at least one secondary polygon;
(vii) determining whether said at least one secondary polygon is a convex quadrangle;
(viii) if said at least one secondary polygon is a convex quadrangle, storing said at least one secondary polygon;
(ix) if said at least one second polygon is not a convex quadrangle;
(x) determining whether said at least one secondary polygon is a triangle;
(xi) if said at least one secondary polygon is a triangle, determining whether an angle of said triangle is close to 90 degrees;
(xii) if said angle is close to 90 degrees, determining whether a hypotenuse center of said triangle is close to an image center of said black image;
(xiii) if said hypotenuse center is close to said image center, adding a fourth point to said at least one secondary polygon to complete a quadrangle; and
(xiv) providing respective coordinates for each detected quadrangle.

16. A method for comparing a VSCC signature of a Video-Signal Camera Capture (VSCC) from a background scene to real-time signatures, residing on a remote server, created from a video stream, the method comprising the steps of:
(a) extracting relevant metadata from the video stream;
(b) obtaining relevant source metadata corresponding to the video stream from at least one source other than the video stream;
(c) computing at least one compact server signature from the video stream;
(d) storing said at least one compact server signature in a database;
(e) upon receiving a client request having at least one compact client signature, comparing said at least one compact client signature with at least one stored compact server signature in said database; and
(f) determining whether at least one match was found between said at least one compact client signature and said at least one stored compact server signature; and
(g) fulfilling said client request by providing said at least one match.

17. The method of claim 16, wherein said step of storing includes storing said at least one compact server signature in said database with said relevant metadata and/or said relevant source metadata.

18. The method of claim 16, wherein said relevant metadata and/or said relevant source metadata are selected from the group consisting of: a video-content channel, a video-content program, a program type, a program detail, a cast detail, a subtitle, a relevant ad, a relevant promotion, a viewer activity, a viewer comment, a viewer rating, a viewing statistic, content for a quiz, content for a vote, and content for a call-to-action.

* * * * *

Disclaimer

9,602,870 B2 — David Amselem, Meitar (IL); Yuval Hava, Meitar (IL); Adi Shavit, Mevarreret-Zion (IL); Dana Shavit, Mevasseret-Zion (IL). DEVICES, SYSTEMS, METHODS, AND MEDIA FOR DETECTING, INDEXING, AND COMPARING VIDEO SIGNALS FROM A VIDEO DISPLAY IN A BACKGROUND SCENE, USING A CAMERA-ENABLED DEVICE. Patent dated March 21, 2017. Disclaimer filed October 9, 2018, by the assignee, TVTAK LTD.

Hereby disclaims the entire term of all claims of said patent.

*(Official Gazette, March 30, 2021)*